March 12, 1968   F. E. GUPTILL, JR., ETAL   3,373,105
RECOVERY OF FRESH WATER FROM BRINE Filed Sept. 3, 1964   2 Sheets-Sheet 1

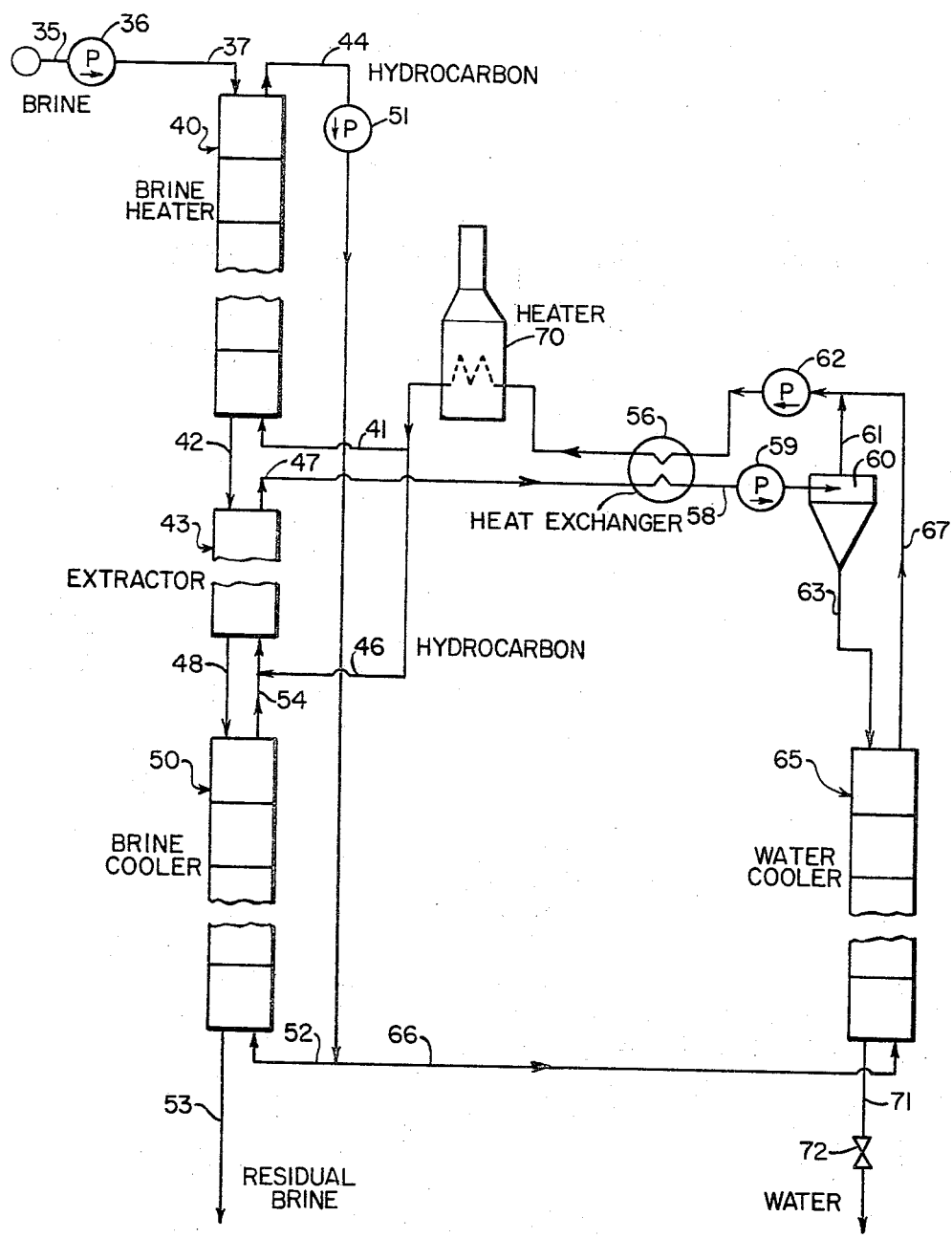

United States Patent Office 3,373,105
Patented Mar. 12, 1968

3,373,105
RECOVERY OF FRESH WATER FROM BRINE
Frank E. Guptill, Jr., Fishkill, and Howard V. Hess, Glenham, N.Y., assignors to Texaco Inc., New York, N.Y., a corporation of Delaware
Filed Sept. 3, 1964, Ser. No. 394,244
19 Claims. (Cl. 210—59)

ABSTRACT OF THE DISCLOSURE

Fresh water is separated from brine by selective extraction with an organic liquid at elevated temperature and pressure in a batch extraction process, preferably in a series of counterflow batch extraction steps, utilizing as solvent higher molecular weight hydrocarbons, alcohols, ethers, aldehydes, and forming a liquid complex or extract phase immiscible with residual brine, wherein separation of said extract phase from residual brine is preferably carried out by utilizing a centrifugal force of at least one $g$ developed in a vortex-forming zone, e.g. a cyclone separator.

---

The present invention relates to a novel process and apparatus for separating fresh water from brine. The process is applicable to the recovery of salt-free water from brines and to the concentration of various brines for the recovery of soluble salts contained therein.

In one of its more specific aspects, the present invention is concerned with a process for separating water from a salt solution or brine wherein an organic liquid, e.g., a hydrocarbon, characterized by the property of extracting a greater amount of water at a high temperature (e.g., at a temperature of 500° F. or above) than at a lower temperature is brought into contact with brine at elevated temperature to extract water from the brine and form a complex substantially free from inorganic compounds. The complex, which is immiscible with the residual brine, is separated from the brine by gravity, and, after separation from the residual brine, the complex is resolved by reducing the temperature sufficiently below the extraction temperature to cause the organic liquid and water to separate from one another as two immiscible liquid phases. Either the water phase or the residual brine may be recovered as product and the organic liquid phase recycled to the extraction zone.

Hydrocarbon liquids are preferred as the organic liquid for extraction of water from brine by the process of this invention. Other organic liquids useful in the process include high molecular weight hydrocarbon derivatives; for example, 8–12 carbon atom alcohols, ketones and ethers, may be used in the process. The basic process is disclosed in the copending U.S. patent application of Howard V. Hess, Ser. No. 144,240, filed Oct. 10, 1961.

The term "brine" is used in a broad sense to denote the entire range of concentrations of water soluble inorganic compounds in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfates of sodium, potassium, lithium, calcium, magnesium, zinc and copper.

The term "complex" is used herein to designate the solution of water in organic liquid, e.g. hydrocarbon liquid, especially the extract leaving the extraction zone, since it is not entirely certain at this time whether it is a true solution of water in hydrocarbon liquid or a hydrocarbon solution containing a hydrate of the water and hydrocarbon.

For greatest efficiency, the present process should be operated at a temperature above 500° F. for the extraction step after which the temperature is reduced below the extraction temperature for the phase separation step, advantageously at least 50° below the extraction temperature, to assure breaking out the major part of the water. Somewhat greater extraction efficiency is obtained if the temperature is kept above 550° F.

By way of illustration, n-decane has the property of extracting 22.2% of its weight of water at 575° F., 9% at 550° F., and only 3.3% at 500° F. Consequently, with the extraction process operating at 575° F., and the decomposition step at 500° F., there is a recovery of water in the amount equivalent to about 19 percent of the weight of the n-decane.

The operating pressure of the extraction step should be sufficiently high to maintain a major portion of the brine and the organic liquid in liquid phase at the operating temperature. The operating pressure is normally greater than 1000 p.s.i.g. and sometimes as high as 3000 p.s.i.g. Usually the complex is resolved and the water separated from the organic liquid at the same operating pressure as that in the extraction zone.

The upper temperature limit should be below that at which decomposition of the organic liquid might occur under operating conditions.

Normally liquid hydrocarbons are generally suitable for use in the process of this invention. Hydrocarbons and mixtures of hydrocarbons containing from 6 to 30 carbon atoms per molecule may be used. Hydrocarbons of 6 to 20 carbon atoms, particularly, 9 to 12, per molecule are preferred. Various petroleum fractions including kerosene, naphtha, odorless spirits, gasoline, and lubricating oil fractions, may be used in the process. Examples of individual hydrocarbon types which can be used in the process of the present invention, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g., benzene, toluene, cumene, xylenes, methylnaphthalenes, etc.

The preferred organic liquids are those which are stable under the temperature and pressure conditions employed in the process, for example, 550° F. to 650° F. and 1000 to 3000 p.s.i.g. For potable water, the organic liquid should have low toxicity and low solubility in water at ordinary temperatures and atmospheric pressure. In general, the saturated hydrocarbons are preferred for the production of water for domestic uses.

Some petroleum fractions may include impurities, e.g., sulfur compounds, but such impurities do not normally exist in sufficient quantity to adversely affect the use of the petroleum fractions in the process of the invention. These impurities tend to be removed from the hydrocarbons after a short period of use.

FIG. 2 illustrates diagrammatically a more complex and more efficient arrangement of apparatus for carrying out the process of this invention.

The present invention provides a novel, compact plant for the recovery of fresh water from brine.

Figure 1:
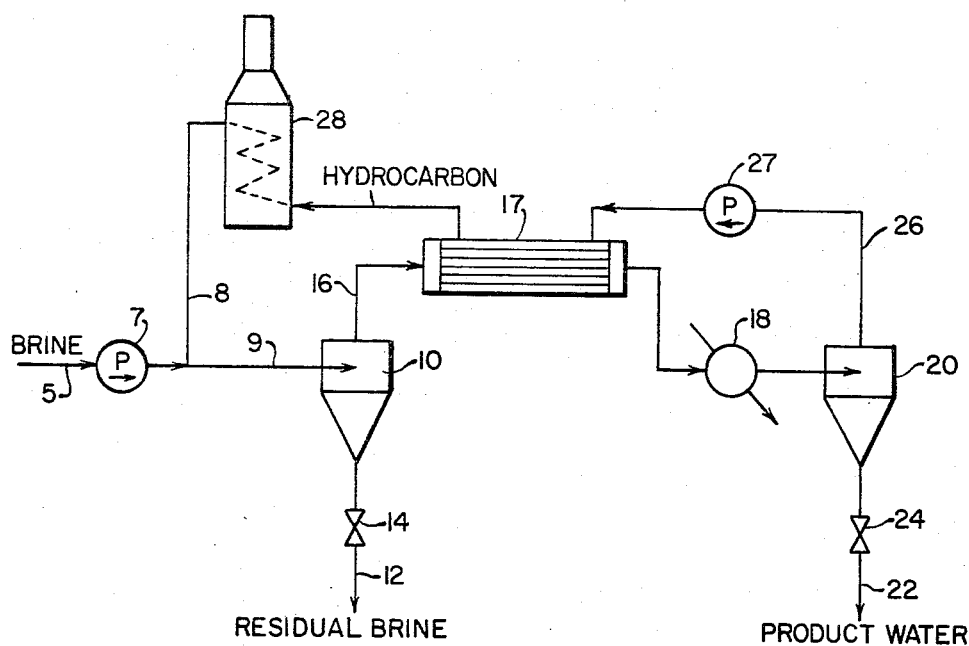
FIG. 1 illustrates diagrammatically a simple arrangement of apparatus for carrying out the process of this invention.

With reference to FIG. 1, brine at ambient temperature is drawn from a suitable source of supply through line 5 by pump 7 where its pressure is raised to extraction pressure, suitably in the range of 1000 to 3000 p.s.i.g., usually within the range of 1500–2500 p.s.i.g. The brine, e.g., sea water, is mixed at elevated pressure with hot hydrocarbon liquid, e.g., benzene, at a temperature in the range of 600 to 800° F., passed through line 9 at a velocity sufficient to ensure turbulent flow and intimate mixing of the hydrocarbon liquid and brine, preferably at a velocity in the range of 2 to 10 feet per second. The resulting mixture of brine and hydrocarbon at a temperature effective for extraction of water from the brine, i.e., in the range of 500–750° F., preferably in the range of 550 to 650° F., and is discharged into a hydrocyclone or liquid cyclone separator 10 which develops a high centrifugal force and effects rapid separation of the brine phase from the hydrocarbon phase. As a specific example, sea water at 70° F. containing 3.5 weight percent salt is pumped at 2100 p.s.i.g. into line 9 and mixed with hydrocarbon liquid from line 8 at 800° F. so that the temperature of the resulting brine-hydrocarbon mixture is about 600° F. and introduced to cyclone separator 10.

Cyclone separator 10, illustrated diagrammatically, is a conventional liquid cyclone separator and may comprise one or more hydrocyclones. The hot hydrocarbon liquid from line 8 forms an extract of salt-free water in hydrocarbon liquid in line 9 which is separated from residual brine in cyclone separator 10. Residual brine is discharged from separator 10 through line 12 as controlled by valve 14. The extract of water in the hydrocarbon is discharged from separator 10 through line 16 to heat exchanger 17 where it is cooled by indirect heat exchange with hydrocarbon separated from the extract as described hereinafter. Cooling of the extract to a temperature below 500° F., preferably below 300° F., causes the extract to separate into a hydrocarbon phase and a water phase. The mixture is further cooled in cooler 18, e.g., by heat exchange with the brine or sea water, and introduced to separator 20 where the hydrocarbon is separated from the liberated fresh water.

In cooler 18, the extract is cooled to a temperature below the boiling point of water, preferably to near atmospheric temperature, for example, 80° F. The cooled mixture of hydrocarbon and fresh water is discharged into hydrocyclone separator 20 which develops a high centrifugal force and which may comprise one or more hydrocyclones.

Product water substantially free from hydrocarbon liquid is separated from the hydrocarbon liquid and discharged from separator 20 through line 22 as controlled by valve 24. Hydrocarbon liquid leaves the top of the separator 20 through line 26 and is pumped by pump 27 through heat exchanger 17 and heater 28 to line 8. In heat exchanger 17, the hydrocarbon liquid is heated by indirect heat exchange with extract from separator 10, after which the hydrocarbon liquid is heated to the desired temperature, for example 800° F., in heater 28. The recycle rate of the hydrocarbon is preferably chosen so that at the temperature of the mixture in line 9 and cyclone separator 10, about 90 percent of the water is extracted from the sea water or brine supplied to the system from line 5.

In FIG. 2, a more complex system is illustrated in which heat is recovered from the hot water and residual brine by direct heat exchange.

With reference to FIG. 2, brine, for example, sea water at ambient temperature, is drawn through line 35 by pump 36, raised to an elevated pressure, and introduced through line 37 into the cold end of a multiple stage hydrocyclone countercurrent contacting brine heating unit 40. A single stage is illustrated diagrammatically in FIG. 3. Each stage of the unit comprises a plurality of hydrocyclone units which may be arranged in parallel and may be combined in series, for example, so that the overflow of one is passed directly to the inlet of another or so that the underflow of one passes to the inlet of another as known in the art and as required for the desired degree of separation of the water phase from the hydrocarbon phase. Brine from line 37 enters the first stage of the heating unit through line 37A of FIG. 3, and is mixed with warmer hydrocarbon liquid from pump 38A and line 39A and introduced to a hydrocyclone separator 40A, the first of a series. Mixing of the brine and hydrocarbon liquid results in heating the brine and cooling the hydrocarbon liquid. The heated brine and cooled hydrocarbon are separated from one another in cyclone separator 40A. Hot hydrocarbon liquid enters the hot end of heater 40 through line 41 and flows upward through the successive stages where it is cooled by direct successive contacts with the brine. The cool hydrocarbon liquid is discharged through line 41A to line 44 and utilized for the cooling of fresh water as described hereinafter. Preheated brine is discharged from cyclone separator 40A through line 37B to the next stage in the series where it is mixed with warmer hydrocarbon liquid and introduced into the next cyclone separator of the series, 40B (not illustrated). As in the first stage, the brine is further heated, and the cooled hydrocarbon liquid supplied through line 41B to pump 38A. The brine progresses downward through a series of mixing and separating stages in brine heater 40 where it contacts successively hotter hydrocarbon streams from line 41 and is finally discharged through line 42 to extractor 43.

Figure 3:
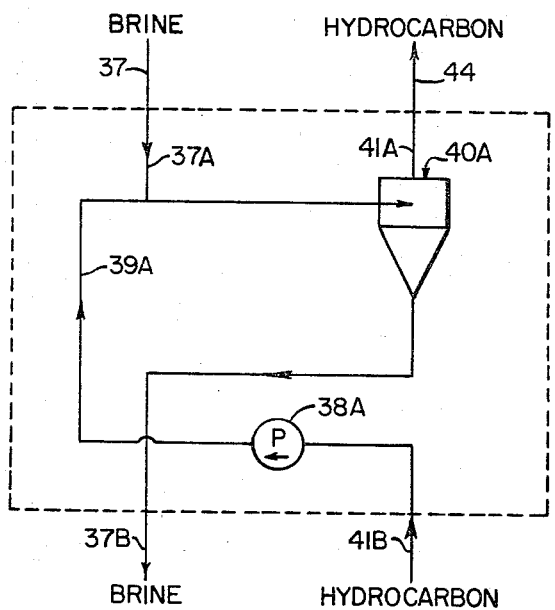
FIG. 3 illustrates diagrammatically a typical single stage of the multi-stage countercurrent contacting operations of FIG. 2.

As a specific example, sea water containing 3.5 percent salt is fed at the rate of 4224 pounds per hour at 70° F. and 2400 p.s.i.g. into the cold end of a 20 stage countercurrent system as illustrated in FIGS. 2 and 3. Cumene is supplied to the hot end of the brine heater 40 at 660° F. through line 41 at the rate of 7296 pounds per hour together with 527 pounds per hour dissolved water. Preheated brine, at 640° F., is discharged into extractor 43 comprising three stages of contacting mixers and cyclone separators as illustrated in FIG. 3. Brine entering the extractor through line 42 is mixed with hot hydrocarbon liquid, introduced into the last cyclone of the series, relative to brine flow, through line 46 at 660° F., at the rate of 3388 pounds per hour together with 244 pounds per hour dissolved water. The hot hydrocarbon liquid from line 46 forms a complex of salt-free water with the hydrocarbon, and the complex comprising 4234 pounds per hour of hydrocarbon, e.g., cumene, and 4234 pounds per hour of water is discharged through line 47. The residual brine, e.g., at 640° F. is discharged from the extraction zone 43 through line 48 to brine cooler 50.

Brine cooler 50 comprises several stages of mixers and cyclone separators as illustrated in FIG. 3. In brine cooler 50, the residual brine is cooled by direct heat exchange with the cool hydrocarbon from line 44, supplied by pump 51 through line 52 to the cold end of the brine cooler. In this specific example, the brine cooler comprises eight stages of mixers and cyclone separators as illustrated in FIG. 3. Cumene at 90° F. and 2400 p.s.i.g. from the top of brine heater 40 is supplied through line 52 to brine cooler 50 at the rate of 846 pounds per hour and is heated to 620° F. in the brine cooler by the residual brine. The hydrocarbon from the brine cooler 50 is discharged at 620° F., mixed with hot hydrocarbon from line 46 and supplied to extractor 43. Residual brine is discarded from the brine cooler 50 through line 53, in this example at the rate of 757 pounds per hour at 278° F.

The complex or extract of water in hydrocarbon is discharged from extractor 43, e.g., at 640° F., through line 47 to heat exchanger 56 where it is cooled by indirect heat exchange with relatively hot hydrocarbon liquid, e.g., at 482° F., cooling the complex to 500° F., for example, and further heating the hydrocarbon liquid, e.g., to 620° F. In heat exchanger 56, the complex is cooled to a temperature such that some of the water contained in the complex is liberated from the hydrocarbon liquid, e.g. at 500° F.

Cooling of the complex in the heat exchanger 56 releases water to form two immiscible liquid phases, one comprising fresh water containing only a small amount of hydrocarbon, e.g., less than 1 percent by weight, and the other comprising a hydrocarbon liquid phase containing a minor amount of water, e.g., less than 10 percent by weight.

The cooled mixture, e.g., at 500° F., is introduced through line 58 by pump 59 into a cyclone separator 60 where the water phase is separated from the hydrocarbon liquid phase. The hydrocarbon liquid phase is withdrawn from the top of separator 60 through line 61, e.g., at 500° F. where it is mixed with hot hydrocarbon from water cooler 65, described hereinafter and passed by pump 62 through heat exchanger 56 where it is heated, e.g., to 620° F. by heat exchange with hot complex.

Water separated from the complex in separator 60, e.g., at 500° F., is withdrawn from the separator 60 through line 63 to water cooler 65 which is a multi-stage arrangement of mixers and cyclone separators, each stage of which is like that of FIG. 3. In this specific example, the water cooler comprises 18 stages with hydrocarbon liquid at 90° F. entering the cold end of the water cooler 65 through line 66 at the rate of 6450 pounds per hour and containing 4 pounds per hour of water. The hydrocarbon liquid, e.g., at 472° F., is drawn from the top of water cooler 65 by pump 62 and passed with hydrocarbon liquid from line 61 through heat exchanger 56 where it is further heated, e.g., to 620° F. The heated hydrocarbon, in this example at the rate of 10,684 pounds per hour with 771 pounds per hour of water then flows through heater 70 where it is further heated, e.g., to 660° F. and passed through lines 41 and 46 to the brine heater 40 and extractor 43.

Fresh water from separator 60, e.g., at a temperature of 500° F., is discharged through line 63 into the hot end of water cooler 65 where it is cooled by multiple contacts with counterflowing hydrocarbon from line 66. The cooled fresh water, e.g., at 120° F., is discharged as product from cooler 65 through line 71 as controlled by valve 72. In this example, the cooled fresh water is discharged at the rate of 3467 pounds per hour.

It will be understood that the cool hydrocarbon liquid entering water cooler 65 through line 66 passes successively through mixers and separators as illustrated in FIG. 3 and is heated, e.g., from 90° F. to 482° F. by the hot water. At the same time, hot fresh water from separator 60 is cooled by heat exchange with the hydrocarbon liquid in the series of mixers and separators, e.g., 18 stages, from a relatively high temperature, e.g., 500° F., to a relatively low temperature, e.g., 120° F.

All of the cyclone separators in the system are operated as liquid-liquid separators with the pressure in each maintained above the vapor pressure of the water or brine and hydrocarbon liquid to preclude vaporization. In this specific example, all are operated at 2400 p.s.i.g. It will be evident that different pressures may be used in different parts of the system, depending on temperatures in the various parts of the system.

Any number of stages can be used in either the brine heater 40, brine cooler 50 or in the water cooler 65.

We claim:

1. In a process for extracting water from brine wherein brine is intimately contacted with an organic liquid capable of forming a complex with water substantially free from salt and substantially immiscible with residual brine at a temperature above about 500° F. and at an elevated pressure sufficient to maintain water and said organic liquid predominantly in liquid phase whereby a substantial quantity of water free from salt is extracted from said brine by said organic liquid in the form of said complex, the improvement which comprises admixing hot organic liquid with brine forming a mixture having a temperature above 500° F. comprising said complex and residual brine, subjecting said mixture to centrifugal force in a vortex-forming zone effecting separation of residual brine from said complex, cooling said separated complex to form a water phase and a separate organic liquid phase, and separating water from said organic liquid.

2. A process according to claim 1 wherein the mixture of water and organic liquid resulting on cooling of said complex is subjected to centrifugal force in a vortex-forming zone effecting separation of water from said organic liquid.

3. A process according to claim 1 wherein said organic liquid separated from water is passed in indirect heat exchange with said complex effecting cooling of said complex and heating of said organic liquid.

4. A process according to claim 3 wherein said cooled complex is further cooled prior to separation of water from said organic liquid.

5. A process according to claim 3 wherein said heated organic liquid is further heated and admixed with said brine.

6. A process according to claim 1 wherein said centrifugal force is generated by tangentially introducing said mixture of brine and organic liquid into said vortex-forming zone at a velocity sufficient to develop a centrifugal force of at least one $g$ in said vortex-forming zone.

7. A process according to claim 1 wherein said organic liquid consists essentially of hydrocarbons containing not less than 6 and not more than 30 carbon atoms per molecule.

8. A process according to claim 1 wherein the mixture of hot organic liquid and brine has a temperature within the range of 550 to 650° F.

9. A process for extracting water from brine which comprises admixing relatively cool brine with relatively hot hydrocarbon liquid in a first contacting zone whereby said hydrocarbon liquid is cooled and said brine is heated, separating resulting preheated brine from said cooled hydrocarbon liquid in a first separation zone, admixing said preheated brine from said first separation zone with hotter hydrocarbon liquid in a second contacting zone thereby further heating said brine and cooling said hotter hydrocarbon liquid, separating said further preheated brine from said hydrocarbon liquid in a second separation zone and passing said hydrocarbon liquid from said second separation zone to said first contacting zone as said hot hydrocarbon liquid, admixing said heated brine from said second separation zone at a temperature not above about 500° F. with hydrocarbon liquid at a temperature above 500° F. to form a mixture having a temperature sufficient to extract water free from salt from said brine in the form of a complex, separating residual brine from said complex, cooling said separated complex to form a water phase and a separate hydrocarbon liquid phase, and separating water from said hydrocarbon liquid.

10. A process according to claim 9 wherein hydrocarbon liquid separated from said water phase is heated to a temperature above 500° F. and supplied to said complex-forming step.

11. A process according to claim 9 wherein complex separated from brine is passed in indirect heat exchange with cooler hydrocarbon liquid effecting cooling of said complex and forming said water phase and separate hydrocarbon liquid phase, and separating water from said hydrocarbon liquid.

12. A process according to claim 9 wherein said water phase and said hydrocarbon liquid phase are separated from one another at an elevated temperature above about 400° F. and said separated water is admixed with cooler hydrocarbon liquid in a first water cooling step whereby said hydrocarbon liquid is heated and said water cooled, said heated hydrocarbon liquid is separated from the water and thereafter passed in indirect heat exchange with said extract and then into contact with preheated brine as said hotter hydrocarbon liquid for preheating said brine in said second contacting zone.

13. A process according to claim 12 wherein said cool hydrocarbon liquid is obtained from said first separation zone.

14. A process according to claim 13 wherein cooled water separated from said hydrocarbon liquid is admixed with cool hydrocarbon liquid in a second water cooling step effecting further cooling of the water and heating of the hydrocarbon liquid, said hydrocarbon liquid is separated from said cooled water of said second water cooling step and passed into contact with water in said first water cooling step.

15. In a process for extracting water from brine wherein brine is intimately contacted with hot hydrocarbon liquid at a temperature above about 500° F. and at an elevated pressure sufficient to maintain water and said hydrocarbon liquid in liquid phase whereby a substantial quantity of water free from salt is extracted from said brine by said hydrocarbon liquid in the form of a complex, the improvement which comprises introducing relatively cool brine to the first of a series of successive contacting steps and separation steps and passing the brine through said series of steps, introducing hot hydrocarbon liquid to the last of said contacting and separation steps in said series and passing hydrocarbon liquid separated from each succeeding separation step relative to brine flow to the preceding contacting step whereby said hydrocarbon liquid is progressively cooled and said brine is progressively heated, admixing resulting preheated brine with hot hydrocarbon liquid forming an extract of salt-free water in hydrocarbon liquid, separating residual brine from said complex, cooling said separated complex forming a water phase and a separate hydrocarbon liquid phase, and separating water from said hydrocarbon liquid.

16. A process according to claim 15 wherein said separation steps comprise subjecting said mixtures of hydrocarbon and brine to a centrifugal force of at least one g.

17. A process according to claim 15 wherein relatively hot water separated from said hydrocarbon liquid is introduced to the first of a series of successive contacting and separation steps and passed through said series of steps and relatively cool hydrocarbon liquid is supplied to the last of said contacting and separation steps and hydrocarbon liquid from each succeeding step relative to water flow is passed to the preceding contacting step in said series whereby said water is progressively cooled and said hydrocarbon is progressively heated by direct heat exchange, and cooled water is recovered as product from the last of said separation steps in said series.

18. A process according to claim 17 wherein hydrocarbon liquid heated by direct heat exchange with said water is further heated by indirect heat exchange with hot complex separated from said residual brine and introduced to the last of said contacting and separating steps in said series wherein said brine is preheated by direct contact with hot hydrocarbon liquid.

19. A process according to claim 17 wherein cool hydrocarbon liquid separated from said brine is supplied to the last of said water cooling steps.

References Cited
UNITED STATES PATENTS 3,308,063   3/1967   Hess _____ 210—59

MORRIS O. WOLK, *Primary Examiner.*

S. MARANTZ, *Assistant Examiner.*